US007059819B2

(12) United States Patent
Brackmann et al.

(10) Patent No.: US 7,059,819 B2
(45) Date of Patent: Jun. 13, 2006

(54) PRIVATE PALLET-BOX CARGO SHIPPING SYSTEM

(75) Inventors: Rogers F. Brackmann, St. Charles, IL (US); Jay R. Brackmann, Wheaton, IL (US); Dennis J. Kossnar, Wheaton, IL (US); Jacques M. Dulin, Sequim, WA (US)

(73) Assignee: DM & DB, dba Insight Marketing, St. Charles, IL (US)

( * ) Notice: Subject to any disclaimer, the term of this patent is extended or adjusted under 35 U.S.C. 154(b) by 0 days.

(21) Appl. No.: 10/940,447

(22) Filed: Sep. 14, 2004

(65) Prior Publication Data

US 2005/0036847 A1 Feb. 17, 2005

Related U.S. Application Data

(62) Division of application No. 10/330,149, filed on Dec. 27, 2002.

(60) Provisional application No. 60/374,871, filed on Apr. 22, 2002, provisional application No. 60/344,010, filed on Dec. 28, 2001.

(51) Int. Cl.
*B60R 9/00* (2006.01)

(52) U.S. Cl. ...................... 414/462; 414/809; 414/373; 410/71

(58) Field of Classification Search ................ 414/462, 414/498, 809, 373; 410/71, 77, 80
See application file for complete search history.

(56) References Cited

U.S. PATENT DOCUMENTS 2,607,518 A 8/1952 Cohen
3,240,408 A * 3/1966 Lapansie .................... 224/401
4,102,540 A * 7/1978 Fox et al. .................. 280/833
4,415,298 A 11/1983 Voight
4,746,034 A 5/1988 Ata et al.
4,878,605 A 11/1989 Doyle et al.
5,125,710 A * 6/1992 Gianelo .................... 296/37.1
5,269,414 A 12/1993 D'Hollander
5,310,303 A * 5/1994 Betts ......................... 414/462
5,452,811 A 9/1995 Taravella et al.
5,743,701 A * 4/1998 Green ....................... 414/498
5,900,610 A * 5/1999 Kelly, Jr. ................... 235/385
5,960,708 A 10/1999 DeTemple
6,416,271 B1 7/2002 Pigott

* cited by examiner

*Primary Examiner*—Eileen D. Lillis
*Assistant Examiner*—Charles A. Fox

(74) *Attorney, Agent, or Firm*—Innovation Law Group, Ltd.; Jacques M. Dulin, Esq.

(57) ABSTRACT

A cargo transportation system comprising secure (fully closeable and lockable), sealable, stackable, trackable, universal, auto-latching "pallet boxes" that may be used in two main ways: 1) secured to the undercarriage transverse I-beams of over-the-road semi-trailers by means of loading alignment and hanger assemblies that provide positive locking-in-place; and 2) stackable, up to three or more high, inside the trailer bodies. The inventive pallet boxes are designed to be secured by auto-latching hanger assemblies that are retrofittable on individual types of semi-trailer undercarriages, both US and metric (European, Central and South American, and Asian) standard dimensions. The pallet boxes include vertical sidewall load-bearing channel members permitting stacking fully-loaded pallet boxes three or more high. The pallet boxes may be refrigerated, insulated, or atmospherically controlled, e.g., chargeable with preservative, security or disinfecting gases, during shipping.

10 Claims, 8 Drawing Sheets

Fig. 6A
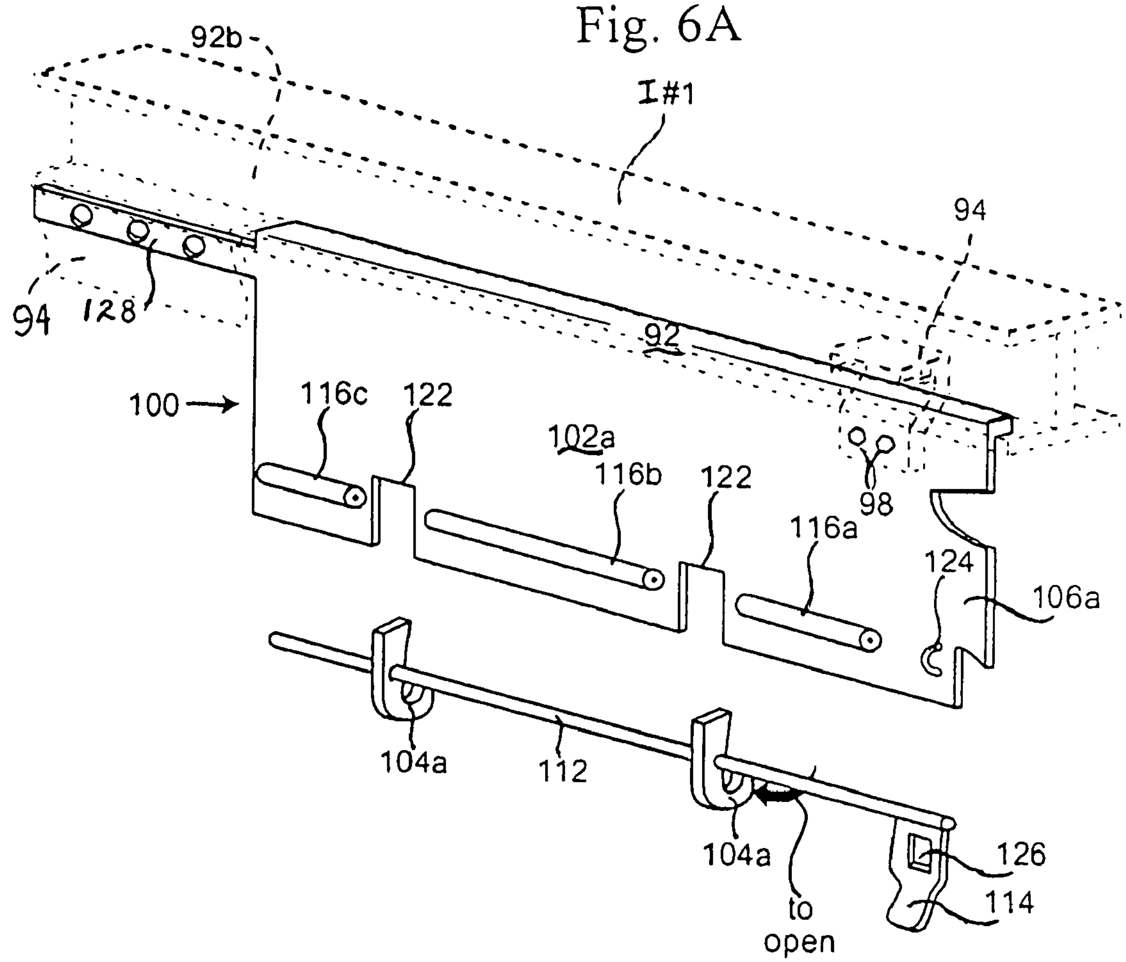
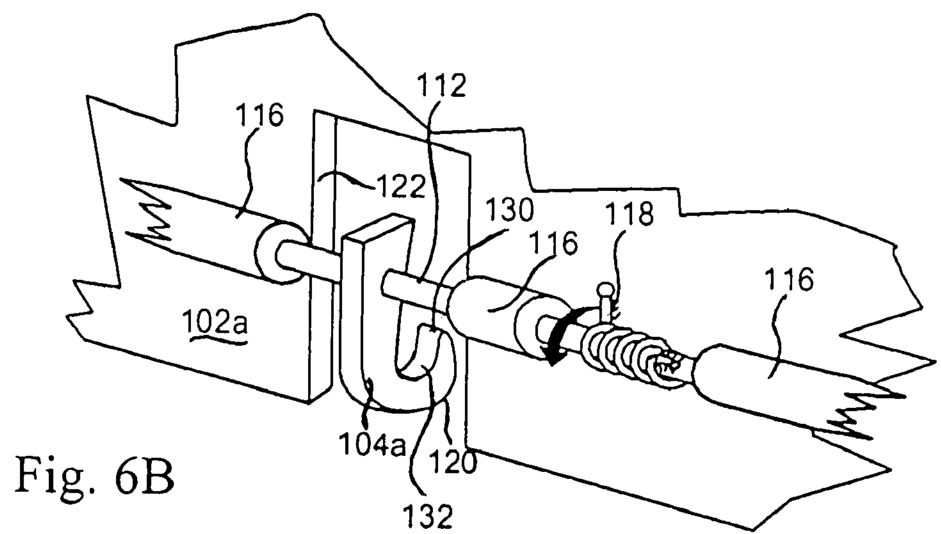
Fig. 6B

PRIVATE PALLET-BOX CARGO SHIPPING SYSTEM

CROSS-REFERENCE TO RELATED APPLICATIONS

This application is the Divisional Application of prior US Regular Application U.S. Ser. No. 10/330,149, filed on Dec. 27, 2002 of the same name, and claims priority dates of Provisional Applications filed by the inventors: U.S. Ser. No. 60/374,871 filed Apr. 22, 2002 entitled Private Pallet Box Shipping System Wit Universal Hanger and Cam Lock Systems, and U.S. Ser. No. 60/344,010 filed Dec. 28, 2001 entitled Private Pallet Shipping System. The disclosures of the Regular US Application and both those Provisional Applications are hereby incorporated by reference, and the priority benefit of the filing dates of both Provisional Applications and the Regular US Application are hereby claimed under 35 US Code Sections 119 and 120, under the Patent Cooperation Treaty and under all other applicable treaties.

FIELD OF THE INVENTION

A cargo transportation system comprising secure (fully closeable and lockable), sealable, stackable, trackable, universal, auto-latching "pallet boxes" that may be used in two main ways: 1) secured to the under-carriage transverse I-beams of over-the-road semi-trailers by means of a guiding latching system; and 2) stackable, up to three or more high, inside the trailer bodies. The inventive pallet boxes are designed to be secured by latching assemblies unique to, and retrofittable-on, individual types of semi-trailer undercarriages, both US and metric (European, Central and South American, and Asian) standard dimensions. The pallet boxes may be refrigerated, insulated, or atmospherically controlled, e.g., chargeable with preservative, security or disinfecting gases, during shipping.

BACKGROUND OF THE ART

A variety of trailer mounted cargo and storage systems have been proposed in the prior art but have not developed into a universal system for cargo transport that answers the complex needs of both shipping customers and the trucking industry. For the most part, the space beneath the undercarriage of long haul trailers has remained unused, with the exception of specialized storage containers for unique needs, such as pallet storage, tools, load securements, emergency equipment (such as snow chains, tow ropes, gloves, caution signs, flairs) and the like.

Companies typically budget 2–4% of the value of a shipment for loss due to theft in transit. A typical type of petty theft occurs from a stacked pallet of merchandise in corrugated containers. A thief will cut or punch a hole in an exposed side of a box, remove some merchandise and then rotate the box to conceal the damaged side. Typical loading dock check-in procedures merely confirm the receipt of a number of pallets containing a number of cartons. Since the time and location of the loss cannot be determined at the time of discovery by simple external inspection, no recovery attempt is made. Such theft losses also occur in the warehouses and back rooms of retailers and wholesalers.

Another common and accepted form of loss is in-transit damage. When items are shipped in corrugated boxes on pallets it is very common for the boxes to sustain corner and end damage that renders them unsuitable for full value retail sale. Many wholesalers and distributors offer a level of claim for damages of 1 to 2% that will be honored without requiring return of goods. These low-level claims are frequently taken as an automatic discount by retailers regardless of the condition of the goods they receive. Additionally, much larger losses due to damage during shipment are not uncommon. Management of such large damage claims, which require return of goods as proof of damage, are very costly. They entail additional shipping costs and substantial administrative overhead, as well as genuine cost of goods due to product loss.

The American Trucking Association reports that the average Class 8 truck having a permitted load capacity of 60,000–90,000 pounds, actually carries a haul weight on average of just under 29,000 pounds (source: ATA Trucking Trends 2000). This represents an underutilization of the truck's hauling capacity in weight of more than 50% on average. The reasons for this are two-fold. First, in some cases, owing to the density of the materials being shipped, the truck simply fills (cubes out) before the weight limit is reached. In this instance undercarriage usage could provide immediate benefit because it effectively increases the carrying volume of the trailer. Second, in other cases, the structural strength of the cargo as packed on un-reinforced pallets does not allow the cargo to be stacked at all, or in other cases does not allow the cargo to be stacked to the full interior height of the trailer.

Examples of undercarriage utilization devices include Johnson U.S. Pat. No. 5,839,760 that discloses a system for mounting to undercarriage I-beams of trailers, both wheel cover skirts for fore-and-aft adjustable rear-wheel bogies and external container packages, the latter consisting of rectangular containers having an internal, manually-operable rack and pinion gear system for engaging opposed l-shaped clamps on the horizontal flanges of the I-beams. Lapansie U.S. Pat. No. 3,240,408 discloses "trapezoidal" containers for transport of granular material during the normally empty return trips of trucks. Alternate containers are nested, with long transverse sides in contact, upside down by flanged pallet portions, with their hinged, full length lids being oriented downwardly. Betts U.S. Pat. No. 5,310,303 shows an underslung trailer cargo container system consisting of a single, large container that spans the full width and free length of the trailer that is retained by outrigger J-hooks mounted to exterior side-rails of the undercarriage, thus increasing the width of the trailer body. Cohen U.S. Pat. No. 2,607,518 shows an insulated underslung container for transport of perishables consisting of a framework having insulated panels, a side-facing one of which is openable, that is removably mounted by bolts and wing nuts to special, triple angle iron rails.

In the category of dedicated undercarriage storage apparatus, Amundson U.S. Pat. No. 4,948,169 shows a swing-out-and-down, 18" deep container that is mounted to a truck undercarriage by a bell crank, guide rail/roller and air cylinder system; a wide skirt is required on the truck to engage the retaining angle iron of the aluminum container. Rudbeck U.S. Pat. No. 4,049,312 shows stepped luggage containers for busses that are bolted to the undercarriage and have openable side panel doors, the stepped cross-section accommodates the recessed center bus aisle. Gothier U.S. Pat. No. 5,957,351 shows a storage rack assembly for flat bed trailers that is clamped by bolts onto the longitudinal, spaced I-beams, as distinct from the transverse I-beams. Amy U.S. Pat. No. 4,772,063 shows a pair of underslung bins for carrying the long straight exhaust tubes for automotive muffler systems. The bins are the full width of the trailer and have opposite side doors and telescoping internal posts to separate the different types of pipes. No hanger system is shown; it appears they are permanently mounted as a product-dedicated system. Selber U.S. Pat. No. 4,564,134 shows a pallet storage rack slung under a truck bed by chains whose length can be adjusted. After loading, canvas covers can be added to protect the pallets from dirt and moisture. Weiner U.S. Pat. No. 4,159,844 shows storage drawers for mobile homes that are secured under the stationary trailer in the skirt area by hand clamps.

Finally, large, plastic and wood open-topped pallet-base containers are in extensive use in the agricultural industry for receipt in the field of lettuce, cabbage, tomatoes, citrus, nuts and the like. An ornamental design for a pallet container is shown in Provot U.S. Des. Pat. No. 382,401 which includes embossed side panels and openings in the base for receiving the forks of fork lifts from all sides. Being open at the top and having slotted upper side rails, this type of bin offers no security against theft, or contamination or damage from weather or other hazards.

Accordingly, this exemplary state of the art reveals that there remains a significant and substantial unmet need for universal, fully closeable and lockable pallet containers for secure shipment of a wide range of goods, both interior of the trailer for improved security and underslung to maximize the unused, permitted carrying capacity of trucks.

THE INVENTION

The invention comprises a cargo transportation system employing secure (fully closeable and lockable), sealable, stackable, trackable (via barcode or GPS), universal, auto-latching, "pallet boxes" that are used in two main ways: 1) secured to the under-carriage transverse I-beams of over-the-road semi-trailers by means of alignment and hanger assemblies that guide and latch the pallet boxes securely in place for transport; and 2) stackable, up to three or more high, inside the trailer bodies. The inventive pallet boxes are designed to be secured by hanger/latching assemblies unique to, and retrofittable-on, individual types of semi-trailer undercarriages, both US and metric (European, Central and South American, and Asian) standard dimensions. The pallet boxes may be refrigerated, insulated, or atmospherically controlled, e.g., chargeable with preservative, security or disinfecting gases, during shipping.

For both the underslung and in-trailer stacked mode embodiments, by way of example, the inventive system employs a plurality of 48"×40"×34" universal pallet box containers. The box height may be varied depending on the trailer undercarriage clearance height, and is preferably selected so that the height in multiples of 2–6, permits stacking inside the trailer body with enough top clearance to permit sufficient lifting by a forklift so the feet clear the feet-recesses of the box on which it is resting. In the case of US specifications, the trailer floor is approximately 48" above ground level. The undercarriage clearance is on the order of 40–42", depending on a number of factors, including I-beam height, bogy design, and tire size. The floor height is based on a standard warehouse loading dock and door system that permits powered pallet dollies and forklifts to enter the trailer from the warehouse to position pallets. This industry standard is a major factor in the available free space beneath the trailer floor framework (the undercarriage).

With respect to the pallet box width, the 48" dimension may be any multiple of 12" to engage the 12" on-center spacing of the semi-trailer under-floor girder (I-beam) structure. Where the trailer I-beams are spaced differently than 12", the box width is preferred to be a selected multiple of that spacing, although it can be any desired dimension. The depth of the pallet box is selected to be less than half the width of the trailer, to permit installation of the docking braces along the centerline of the trailer under the floor.

The pallet boxes, by way of example, may be constructed of any high strength material, and are preferably unitary. Preferred bin materials include steel, fiberglass, high strength homo-polymer or copolymer, laminated or reinforced polymer (such as carbon fiber reinforced polymers), high-density co-molded polyethylene and steel, or any other available suitable rugged material, available at the present or in the future. It is preferred that the pallet boxes be capable of carrying from 2000'–3000' each, and being capable of withstanding the weight of at least two fully-loaded pallet boxes stacked on top of it.

The pallet boxes are attached and locked to the semi-trailer under-floor girder I-beams through alignment and hanger hardware. In a preferred embodiment, J-hooks on the hanger assembly engage locking pins on the sides of the pallet boxes, and as the box is raised, they rotate into a locked position. In the process, box lid is compressed to assist in keeping it sealed during transport.

In the preferred embodiment, the pallet boxes include an exterior reinforcement structure of fabricated steel, termed an "exoskeleton", that functions to provide: 1) structural strength for stacking and support of the boxes when hung under the trailer; 2) attachment points for retaining the boxes when hung under the trailer bed; and 3) fortification of the box against unauthorized entry for security purposes. Steel flat or strapping crosses the lid and engages vertical channels along at least two opposed vertical sidewalls of the box. The side channels extend to the floor and include apertures for access of the forks of a forklift. At least one channel houses a lock mechanism. A steel strapping framework also extends over the box sidewall to cover and secure against theft an optional drop-down access partial-width or full-width door. In the discussion herein, the sidewall with the access door is considered the "front" of the box.

Additional strapping extends under the box floor so that the steel flat under-box strapping in conjunction with the channels to which the strapping is secured acts as a sling. That is, the boxes when loaded under the truck are in fact slung from the J-hooks of the hanger assembly. The steel flat or strapping is typically ¼" thick stock by 2–3" wide; the hanger pins in the vertical side channels are typically ⅜"–½" diameter.

The spaced pairs of vertical channels are provided on at least one pair of opposed side walls and nest or interlock with the framework of a box below and above to assist in transferring the weight of the box and contents to the floor of the trailer for in-trailer stacking. The inventive pallet boxes may be provided with paired vertical channels on all sidewalls, so that the box orientation does not matter for stacking. That is, in the 2-side-with-channels embodiment, the boxes should be oriented so that the channel sides are all aligned to transfer the weight down the stack. In the 4-side-with-channels embodiment, it does not matter, as box "fronts" can be oriented 90° or 180° with respect to the boxes above or below, and the weight will be transferred, as all sides have equally spaced vertical channels.

The optional drop down wall segment (partial door) is provided as an aid in loading and unloading the box. The partial door may be full width of the box, or less than full width, and is typically about one-half the height of the side, although it can be the full height or less. A less than full height front side door is preferred to provide greater structural integrity to the inventive pallet box. As one skilled in the art will appreciate, the door can be provided with conventional hinges at the bottom so that it folds out and down, and includes latches on the side margins that engage the remaining portions of the side wall in which it is located. Preferably the hinges are of the hidden type to prevent dismounting for attempts at contents theft. The door preferably includes hardened latch pins (internal bolts or shackles) for positive locking to the sidewall.

The steel lid strapping end that opens includes either a hole to receive a movable, internal lock shackle (preferred), or at least one hardened, notched bolt end (shackle), that positively engage(s) the lock mechanism in the channel when the lid is closed. The lock is flush mounted into the vertical channel (or other framework part) so as to resist tampering; there are no exposed parts that act as a purchase for a pry bar. Locks permanently mounted in both vertical side wall channel members are preferred, and they may be either keyed, rotary dial type or electronic. The preferred lock system is an electronic lock mechanism that permits identification of which "keyholder" (approved access person or organization) opens the lock(s), when the lock(s) is/are opened, and how long the lock(s) stay opened. By way of example, a suitable electronic lock is the Medeco High Security Switch Lock System, Model 65 series, provided by Medeco Inc. of Salem, Va., USA, a division of Hillenbrandt Industries, Inc.

An important feature of the inventive pallet boxes is that they are each integrated (complete), and highly tamper resistant. That is, there are no loose parts that can be lost during use or storage, and the material is selected for strength to resist casual and relatively concerted theft attempts. The exoskeleton lock is integrated in the channel, the door has internal hinge and latch pins, the door preferably includes an integral lock, and the door is prevented from opening by an extension of the steel framework. The J-hooks and their pivot rods are secured to the hanger assembly and can be locked.

The pallet design provides for stacking and racking in any warehouse environment. The box height and floor footprint are chosen to utilize the interior space of the industry standard trailer van when stacked three units high. The lids are notched in such a way that the feet of the box on top nest into the lid, making the stack more secure. Optionally, the pallet boxes are provided with eyes or other types of lashing attachment points to lash down the boxes. The steel channels on the box side extend the entire height of the box so that when stacked the weight of the box(es) above is/are borne by these steel members.

In addition, spaced feet on the bottom of the pallet boxes provide access there between for the forklift forks. These spaces are present in both horizontal axes in a manner to provide "four-way" accessibility. The loading is a two step process: 1) the forklift brings the closed, loaded pallet box under the truck bed, the guides aligning it as it is laterally placed under the truck, and 2) the fork lift then raising the box to engage the clamps, which may be spring-loaded to automatically engage the box fittings.

The pallet box undercarriage mounting system comprises a three-piece non-invasive retrofit assembly to the trailer bottom. The first piece is a guide and positioning unit (alignment assembly), attached along several consecutive I-beams (typically five I-beams) by means of a bolt-on clamp system. It features a pair of spaced flared entry panels defining a guideway or slip slightly wider than the pallet box to aid in the alignment and guiding of the pallet box as it is being positioned under the truck. This alignment assembly also serves to provide stability and distribute g-forces on the boxes during acceleration and deceleration. The second and third pieces of the mounting system are a pair of mirror image, clamp-on hanger assemblies. They face one another and include pallet box-engaging retaining members comprising J-hooks that automatically engage load-carrying hanger rods on the box sides as the box is raised into position between them. The J-hooks are spring biased in a "normally locked" (down) position. As the box is raised, the hanger pins (latch pins) engage the outer cam surface of the J-hooks, the J-hooks are rotated into an open position and then automatically rotate back to the locked position by the spring force to engage the hanger pins of the vertical side channels. The box is then lowered slightly into the notches of the J-hooks where it is carried securely during transport.

To unlock, a connecting rod and external lever is counter-rotated while the pallet box is in the fully raised position against the bottom of the truck undercarriage, the lifting being accomplished by a forklift, jack or other suitable lift platform. The weight of the box as it rests on the clamps prevents the latching J-hooks from rotating upwardly to the open position. To open the box weight must be relieved by a forklift, jack or other lift platform. The lever may be secured by the use of a bolt, retaining pin or a lock through a hasp. To release the box, the weight is lifted off the clamps and the J-hook levers are manually rotated against the biasing spring force into a raised, lock-release position (unlocked).

The pallet boxes have lids that are preferably provided with hermetic seals, for weather tightness and security. This feature provides security for the shipper and is of great benefit for shipping products requiring "privacy" and/or security, such as pharmaceuticals or mail. In addition, the hermetic seals permit charging the pallet boxes through appropriately located with special atmospheres through appropriate valve port(s) in one or more box walls, such as nitrogen for volatile cargo, or special gases mixtures, e.g., oxygen, CO2, nitrogen, ethylene and other essential gases for produce transport. In addition, other gases can be employed, such as disinfecting or security gases. That is, in the case of mail transport, for example, a gas effective for disinfecting pathogenic agents, such as anthrax spores or smallpox bacterium, can be charged into the box after being loaded with the mail (loose or in permeable bags), so that during transport the mail is provided enough residence time in contact with the gas for through disinfection. In the case of a security gas, the container can be pressurized so that in the event of a theft breach of a container wall, the exhausting gas (and/or marker dye) will ward off the thief. Preferably the gas ports employ conventional threaded or bayonet-type connectors.

The individual pallet boxes, or groups of them, can be hooked to refrigeration systems, and can contain refrigerant coils that are hooked, e.g., by a bayonet or quick disconnect locking system of the type used for hydraulics or compressed air systems, to a manifold that links to the reefer system of the semi-trailer.

Additional objects and advantages of the inventive system include the fact that attaching the weight to the undercarriage of the trailer lowers the center of gravity of the trailer. Thus, the incidences of roll-overs, fairly common in the trucking industry, are less likely to occur. Also, the inventive system provides substantial in-transit theft and damage reduction by virtue of the top and optional side doors being lockable and protected by the exoskeleton strapping and the tough bin wall material. As the inventive pallet boxes are universal in dimension, and include integral pallet-type forklift access, they can be left at the receiving retailer for storage until sale of the goods. Indeed, the inventive pallet boxes permit elimination of the shipping cartons, with the goods being sold directly out of pallet boxes. This reduces the carton cost, the carton packing cost, and the carton volume and weight. More product (goods) can be shipped in the inventive pallet boxes and the carton-related costs eliminated.

Another common and accepted form of transit loss that the invention would reduce is transit damage loss. The inventive rigid and reinforced, integral container substantially and significantly reduces the instance of real transit damage, as well as potentially allowing shippers to lower their thresh-hold for damaged goods claims of the automatic allowance category.

As to the truck hauling-capacity underutilization issue, the reinforced stacking strength of the inventive pallet boxes provides superior volume utilization of the interior cargo space by virtue of the stackability. If, even after stacking the interior of the trailer van, the truck is still under weight-capacity, further benefit is gained by use of the inventive pallet boxes in the underslung mode. Further, the underslung system may be used for fast delivery of partial loads, as the pallet box units can be location-dedicated, carrying single or mixed product loads. The speed and ease of unloading, without opening the main (rear) doors of the trailer permits small load distribution at an economically effective rate.

In connection with tracking, each pallet box can be provided with an identifying code, e.g., proximity-type transponder sensitive electronics such as used in commercially available automotive security systems that are embedded in a wall of the pallet box. Examples of commercially available systems include the Lo-Jack and the Triad systems, the latter being a zero contact system offered by Dealer Security Solutions, Inc.

In addition, for highly valuable cargo, the entire plastic used in forming the walls can include uniquely identifying micro-dots, beads, chips or chaff so that a sample of the box material can be micro-assayed to determine the particulars of the information encoded on the micro-dots. The pallet boxes also include a planar surface onto which a bar code can be emplaced for shipment tracking.

The pallet box can include an integral GPS transponder for tracking and identification, or one can be included in with the goods loaded therein at the time of sealing by the originating shipper or manufacturer. Customs or other security wires and seal systems may also be used. The door and/or channel locks may be programmable locks, e.g., activated by magnetic cards or keys, or of the push-button or dial type, to name a few examples.

One skilled in the security art will appreciate that any desired level of security can be employed, dependent on the value and need, such as national security, anti-terrorist, intellectual property confidentiality, or other such need.

BRIEF DESCRIPTION OF THE DRAWINGS

The invention is described in detail below by reference to the drawings in which:

FIG. 6A is an isometric exploded view of the pallet box hanger assembly, including the side support plate and the paired J-hooks, the connecting rod and the locking lever and hasp;

FIG. 6B is an isometric view of the assembly detail of the J-hook of FIG. 6A showing the biasing spring;

DETAILED DESCRIPTION, INCLUDING THE BEST MODES OF CARRYING OUT THE INVENTION

The following detailed description illustrates the invention by way of example, not by way of limitation of the scope, equivalents or principles of the invention. This description will clearly enable one skilled in the art to make and use the invention, and describes several embodiments, adaptations, variations, alternatives and uses of the invention, including what is presently believed to be the best modes of carrying out the invention.

In this regard, the invention is illustrated in the several figures, and is of sufficient complexity that the many parts, interrelationships, and sub-combinations thereof simply cannot be fully illustrated in a single patent-type drawing. For clarity and conciseness, several of the drawings show in schematic, or omit, parts that are not essential in that drawing to a description of a particular feature, aspect or principle of the invention being disclosed. Thus, the best mode embodiment of one feature may be shown in one drawing, and the best mode of another feature will be called out in another drawing.

All publications, patents and applications cited in this specification are herein incorporated by reference as if each individual publication, patent or application had been expressly stated to be incorporated by reference.

Figure 1:
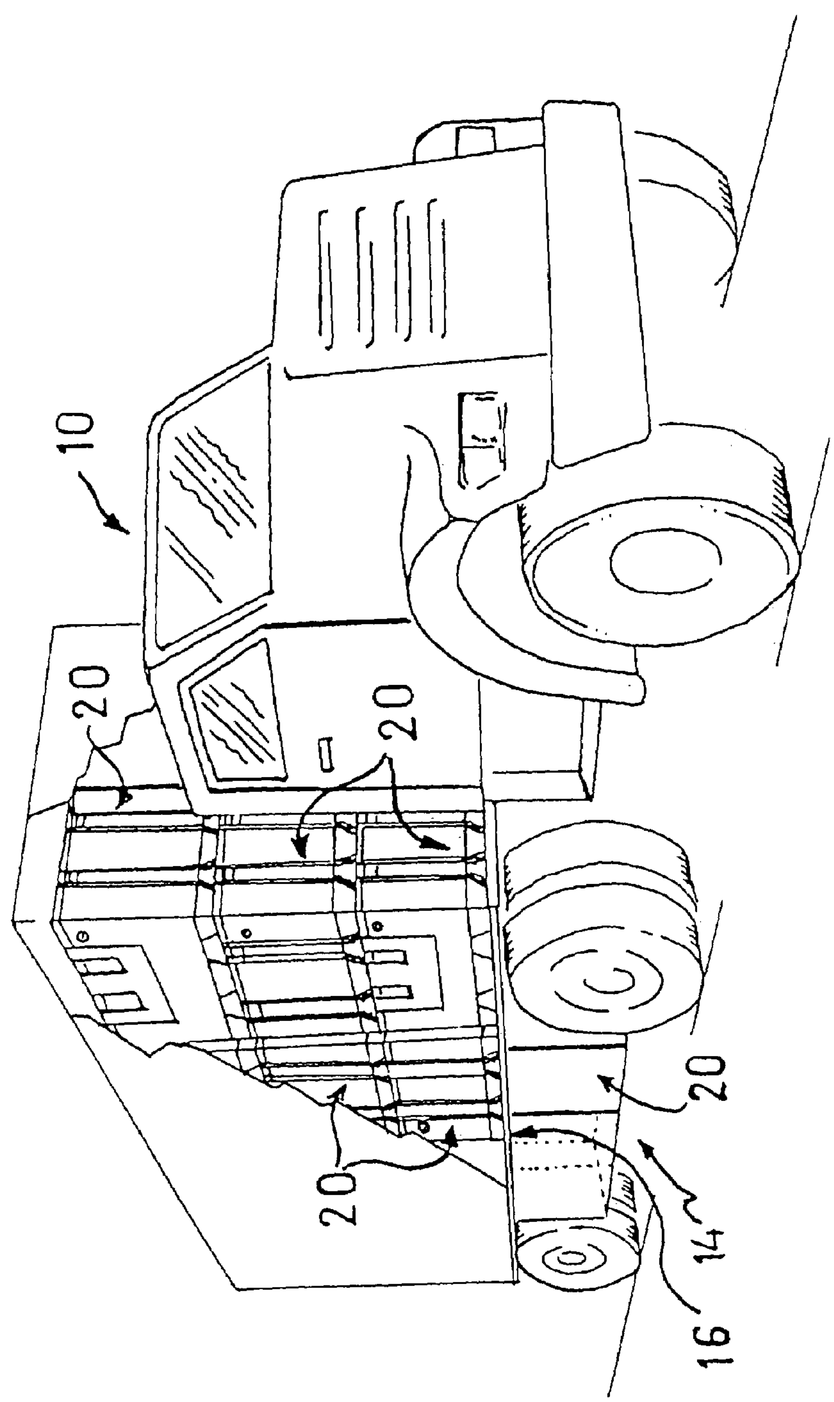
FIG. 1 is a perspective view, partially schematic, of a long-haul truck of the tractor-trailer type showing the inventive pallet boxes in both the underslung transport mode and the in-trailer, stacked mode in the broken-away portion of the trailer.

Referring now to FIG. 1, a long-haul truck 10 of the tractor-trailer type is shown with the inventive pallet box system 12 in both the underslung mode 14 secured to the undercarriage of the trailer 16, and the in-trailer mode 18, the broken away section showing pallet boxes 20 stacked three-high. The underslung mode shows a single pallet box 20, with the positions of two more shown just aft of it in dashed outline. It can be seen that the currently unused space under the truck is efficiently utilized. Note that the location under the trailer does not appreciably increase the wind resistance, and indeed can serve to reduce the air turbulence created by the rear tractor wheels, which in turn can reduce blinding spray thrown up by the truck in rainy or snowy weather.

Figure 2:
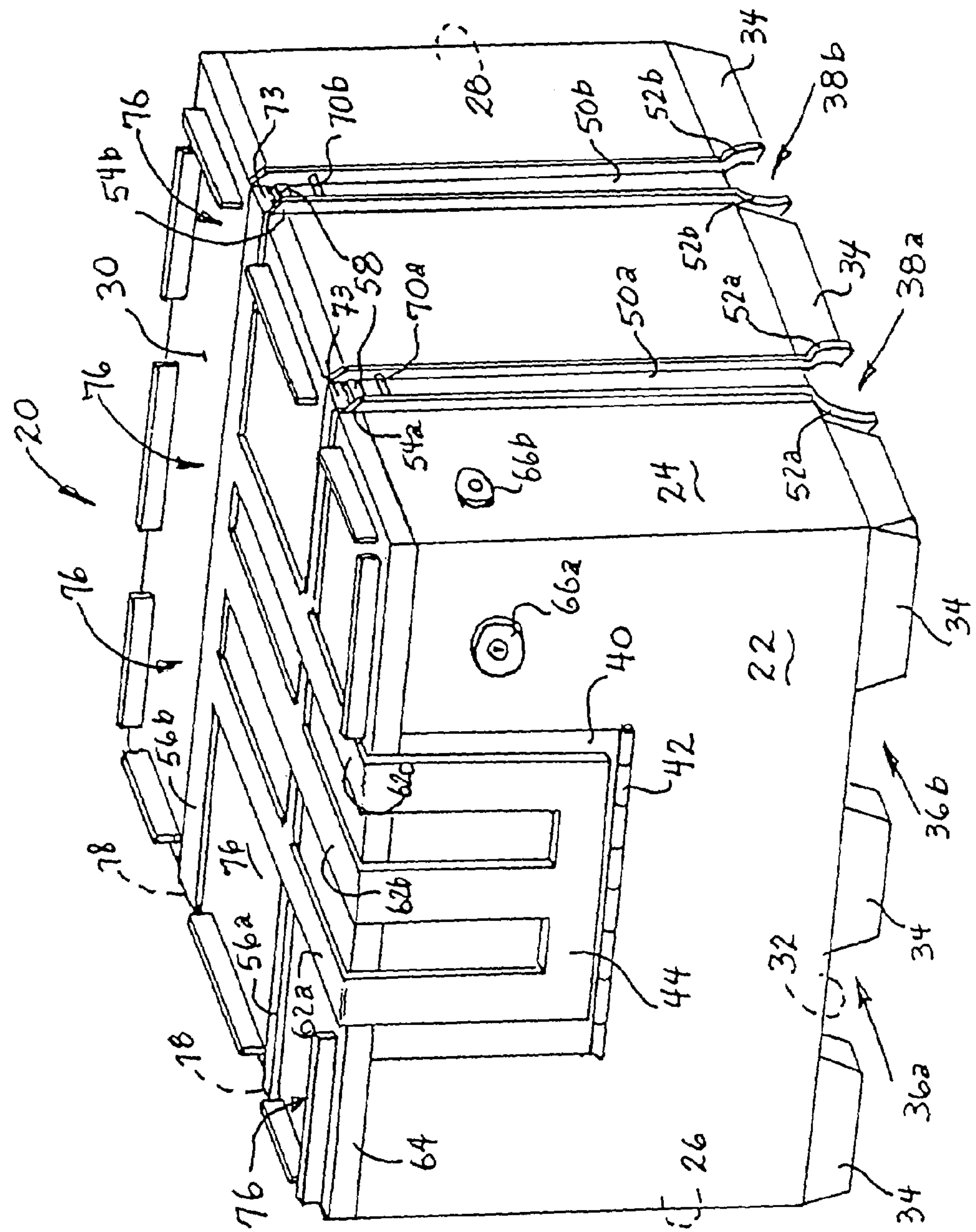
FIG. 2 is an isometric of a first, preferred embodiment of the inventive pallet box showing the small side access door as secured by the strapping gate, the openable top, the side load-bearing channels, the underslung latch pins, the feet recess in the top for stackability, and the 4-way fork lift access.

FIG. 2 shows a first, preferred embodiment of the inventive pallet box 20 having a front side 22, opposed, spaced sides 24, 26, back side 28, openable top 30, and bottom 32 with spaced feet 34 providing access 36*a*, 36*b*, and 38*a*, 38*b* for four-way forklift access. The front side 22 preferably includes a partial side access door 40 hinged at the bottom 42 to fold down (best seen in FIG. 7) once the protective grating 44 is raised. Vertical load-bearing channels 50*a*, 50*b* are seen on the right side, in this embodiment recessed into the sidewall 24. Note the lower portion of each of the channels includes an aperture 38*a*, 38*b*, respectively that is wide enough to receive a forklift tine. The channels 50*a*, 50*b* need not be uniformly wide throughout their height (vertical length), but optionally may include wider foot portions 52*a*, 52*b*, and correspondingly wider top portions 54*a*, 54*b* so that the feet of a second pallet box stacked on top of the pallet box shown in FIG. 2 (see FIG. 1) matingly engage the widened top portions 54*a*, 54*b*. A second pair of vertical support channels are disposed in the opposed side wall (not shown).

Figure 7:
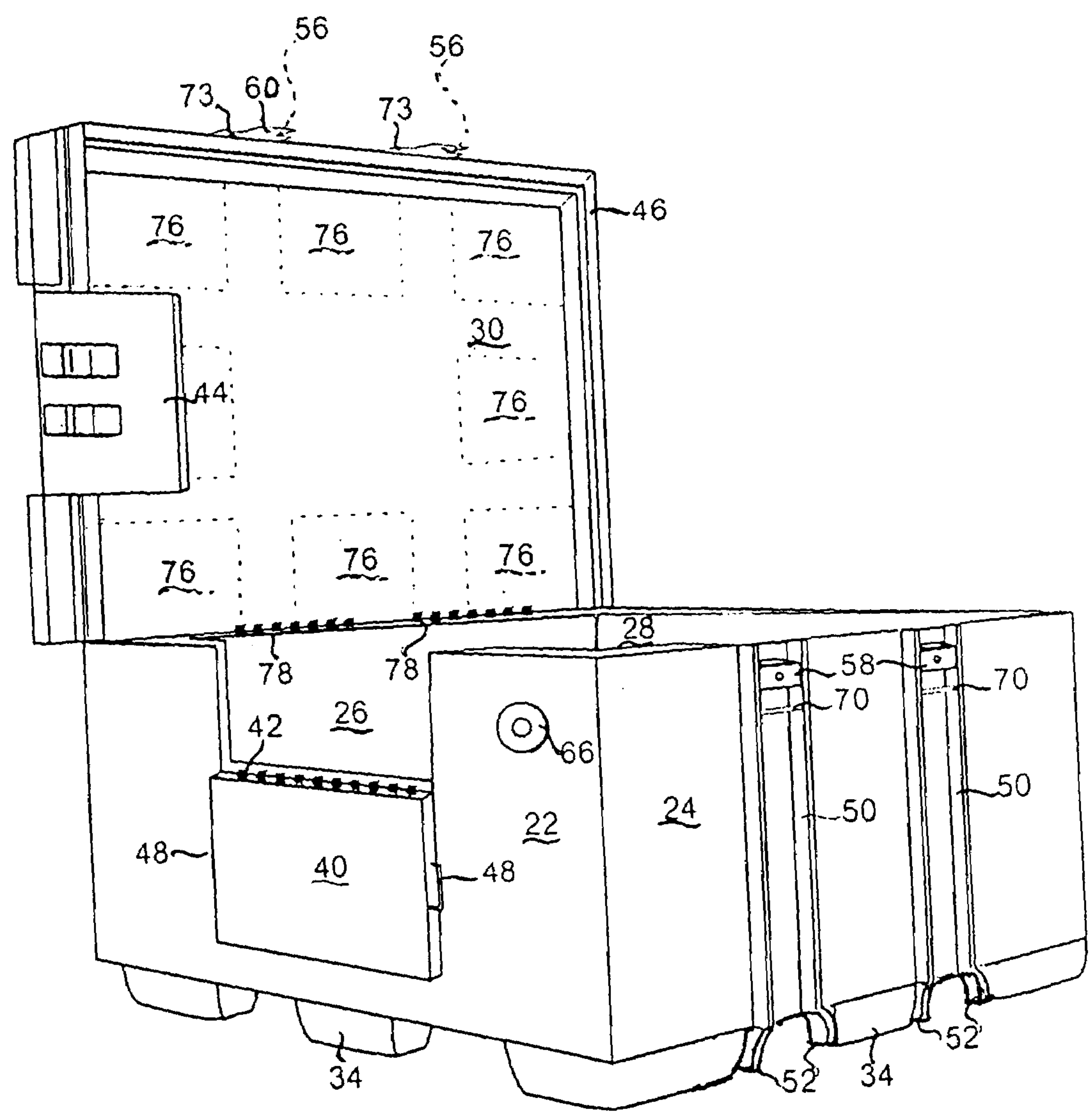
FIG. 7 is an isometric of the pallet box embodiment of FIGS. 1 and 2 from the opposite corner showing the side door protective grate, the side door folded down, a gas inlet/exhaust port for controlling the atmosphere in the box (on the facing side) and a seal for hermetically sealing the lid to the box walls.

The pallet box lid 30 is secured by a pair of lateral steel straps or flats 56*a*, 56*b* extending across the top of the pallet box between the pairs of side wall channels 50 on the opposed sides 24, 26. These lateral steel straps extend a short distance 73 down the side 24 and terminate in a tang portion 60 that engages a shackle 74 in lock 58 (see FIGS. 8A and 8B). The straps 56*a*, 56*b* also extend a short distance down the side 26 and terminate in hinges 78 at the lower marginal edge of lid lip 64 which permits them to pivot upward so that the lid 30 can be opened. This feature is best shown in FIG. 7.

The protective grate 44 includes extension members 62*a*, 62*b*, 62*c* that extend across the top to at least one of the lateral flats, here flat 56*a*, so that as the lid 30 is opened, the protective grate is lifted permitting the drop-down access door 40 to be opened. As can be seen the top 30 preferably has a marginal depending lip 64 that includes a sealing member (not shown) that engages the top of the side walls providing a hermetic seal. One or more gas ports 66*a*, 66*b* are optionally provided for entry and exhaust of the preservative, safety or security gas. The channels also include fixed hanger pins 70*a*, 70*b*, and corresponding fixed hanger pins 72*a*, 72*b* (not shown) on the opposite side 26 which are engaged by J-hooks of the undercarriage hanger/alignment assembly (best seen in FIGS. 4, 5A, 6A and 6B). The dimensioning is such that the engagement of the hanger assembly J-hooks compresses the lid to the side walls to ensure the hermetic seal.

Figure 3:
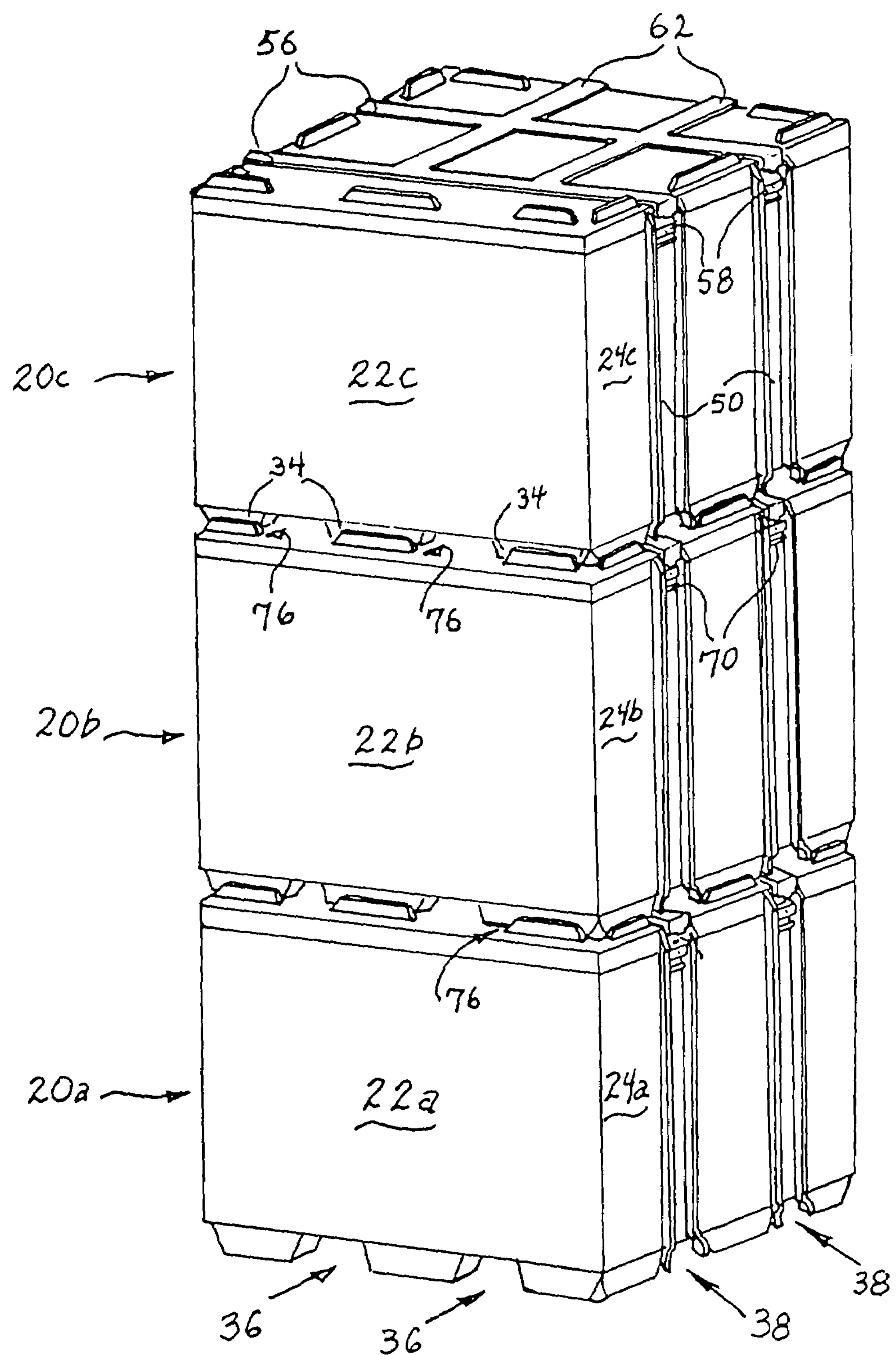
FIG. 3 shows pallet boxes stacked three high in a warehousing configuration or as stacked in the trailer interior during transport.

FIG. 3 shows pallet boxes 20*a*, 20*b*, 20*c* stacked three-high in a warehousing configuration or as stacked in the trailer interior during transport, as shown in FIG. 1. It should be understood that the vertical channels are shown only on opposed sides 24, 26 for simplicity. In another embodiment, the vertical channels are provided on all four sides, including the facing side 22*a*–22*c*. Recesses 76 may be molded into the top panel 30 of each pallet box to receive the feet 34 of a pallet box placed on top.

Figure 4:
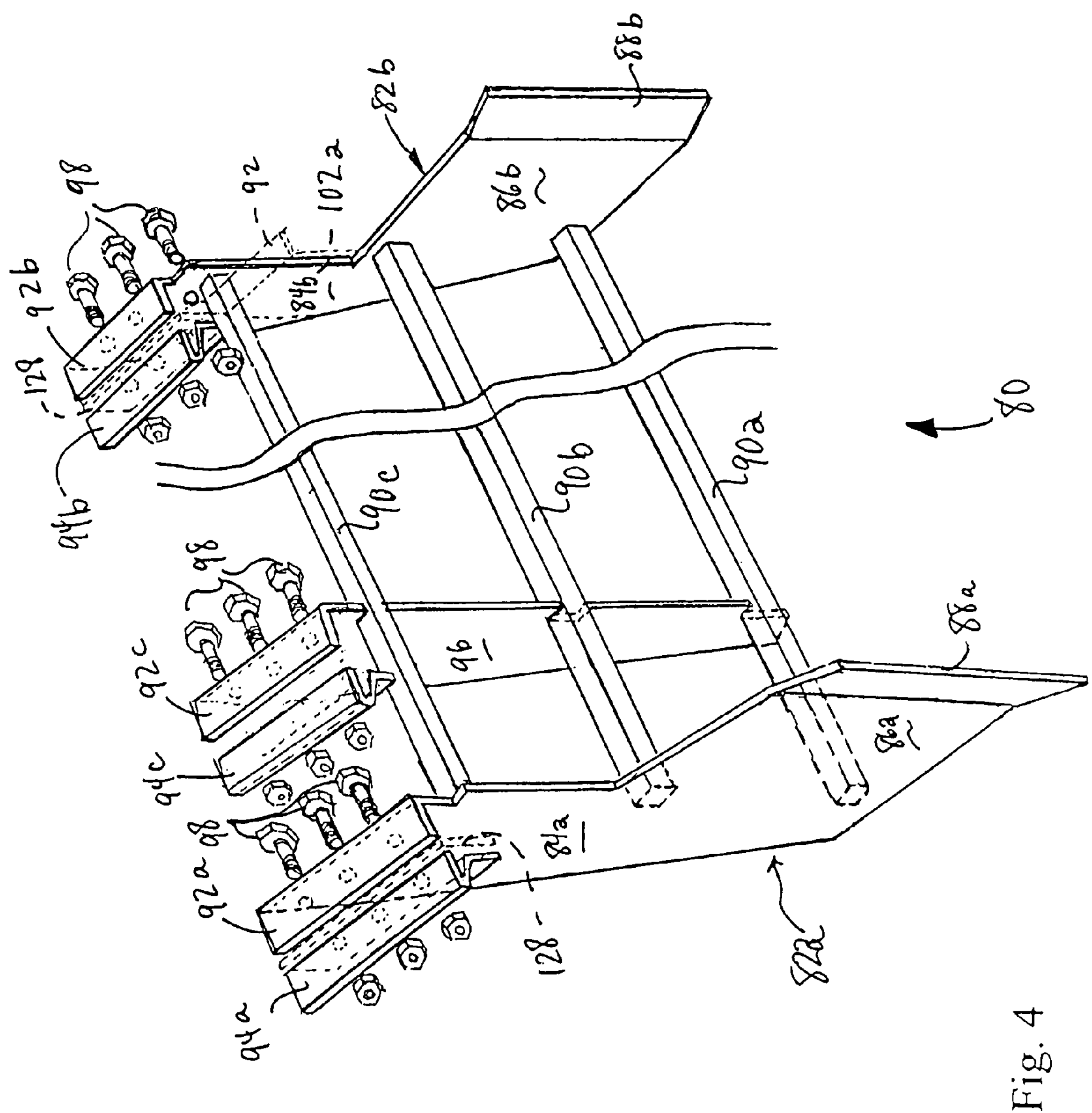
FIG. 4 shows the retrofittable pallet box alignment assembly for guiding the pallet boxes into position under the trailer and thence into engagement with the pallet box latching system.
Figure 5A:
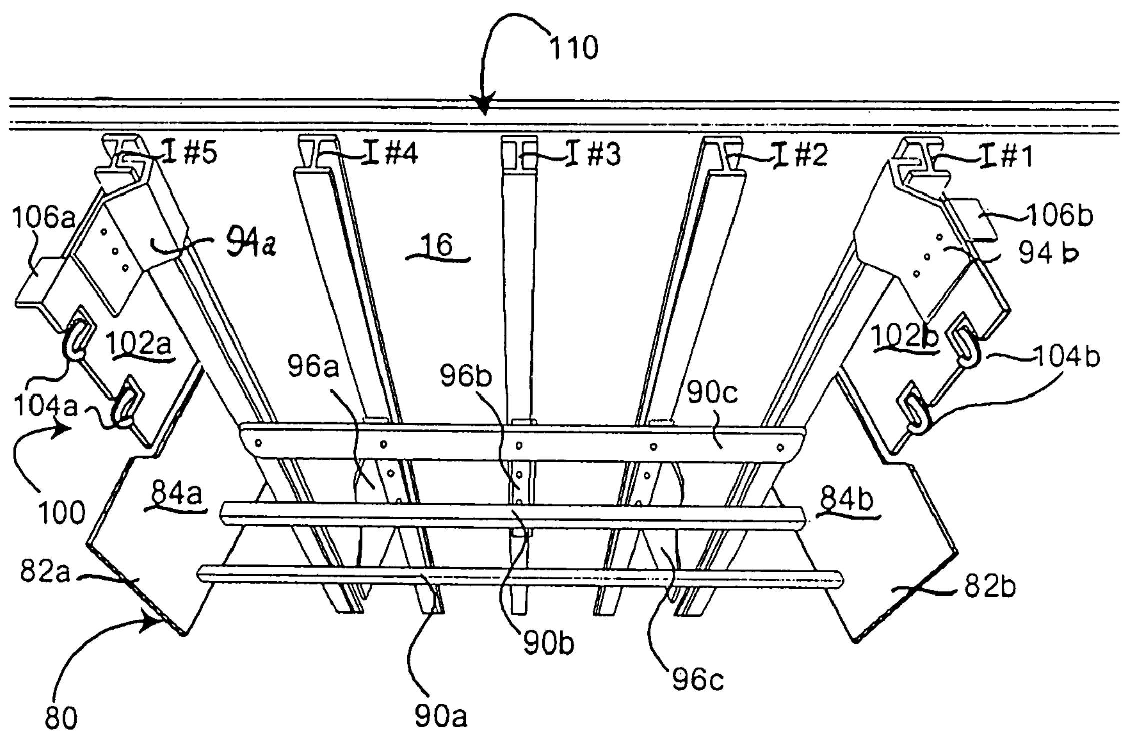
FIG. 5A is a perspective from ground level looking at the undercarriage of a trailer body with the guide and alignment assembly of FIG. 4 mounted to transverse I-beams of the undercarriage, and additionally shows the J-hooks that engage the latch pins on the pallet boxes to positively secure them during transit.

FIG. 4 shows the retrofittable pallet box alignment assembly 80 for guiding the pallet boxes into position under the trailer and thence into engagement with the pallet box hanger assembly 100 of FIGS. 5A, 6A and 6B. The alignment assembly 80 includes a pair of spaced, opposed mirror image guide panels 82*a*, 82*b*. In the view shown, the front of the truck is to the right, so that 82*b* is the forward guide panel, and 82*a* is the rear guide panel. The centerline of the truck is termed the "inboard" end or direction, and the access is termed the "outboard" end or side. FIGS. 4, 5A and 6A are isometrics from an outboard position looking inboard. Note that the guide plates are generally L-shaped as seen in side elevation, with an inboard vertical panel portion 84*a*, 84*b*, and a lower portion 86*a*, 86*b* that extends toward the outboard direction and terminates in flanges 88*a*, 88*b* that are bent backwardly and forwardly, respectively, to provide a wider guiding entry to the alignment assembly. Two or more cross brace members 90*a*, 90*b*, 90*c* provide reinforcement and spacing of the guide panels 82. The tops of the guide panels terminate in horizontal flanges 92*a*, 92*b* that rest on the lower flanges of the undercarriage I-beams. They are secured to the inboard portion of the I-beams by bolt-on clamp members 94*a*, 94*b*, better seen in FIG. 5B. In addition, it is preferred to include one or more medial vertical backing plates 96, that includes flange 92*c* and are notched to receive and be welded to the cross-braces 90. The backing plate is likewise secured to the appropriate I-beam with clamp 94*c*. FIG. 4 shows a single backing plate 96, but it should be understood that one may be used on up to each transverse undercarriage I-beam. Note FIG. 5A shows three backing plates. In FIG. 4, the forward guide panel 82*b* is clamped to I-beam #1, and the rear guide panel 82*a* is clamped to I-beam #5, with the backer plate 96 clamped to I-beam #3.

FIG. 5A is a perspective from ground level looking at the undercarriage of a trailer body with the alignment and docking assembly of FIG. 4 mounted to transverse I-beams #s 1–5 of the undercarriage, and additionally shows the hanger assembly 100 with its latching J-hooks that engage the hanger pins of the vertical side channels 50 of the pallet boxes to positively secure them during transit. Note that the lower portions 86*a*, 86*b* of the guide panels 82*a*, 82*b* extend below the lower margins of the hanger assembly support plates 102*a*, 102*b* because the top of the box 30 (FIG. 2) is below the J-hooks 104*a*, 104*b* as it is being guided under the truck by a forklift in the initial stage of loading. When the back of the box engages the cross-braces 90, they act as docking bumpers; optionally, they may include heavy duty rubber or polymer bumper elements, not shown. As the box is raised, the J-hooks 104*a*, 104*b* are engaged and latch in place. The optional outwardly bent flanges 106*a*, 106*b* also assist in alignment of the box, particularly if it comes in too high at first. The center longitudinal I-beam 108 and the outboard perimeter flange or plate 110 are also shown in FIG. 4, and demonstrate that the inventive pallet boxes are preferred to be somewhat less than half the width of the undercarriage.

Figure 5C:
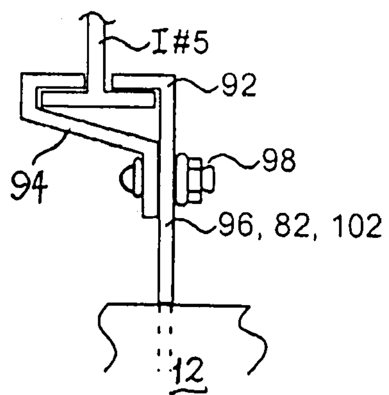
FIG. 5C is a side section view through the inner clamp system showing the engagement of the tang of the hanger assembly by the clamp bolts of the alignment and docking assembly.
Figure 5B:
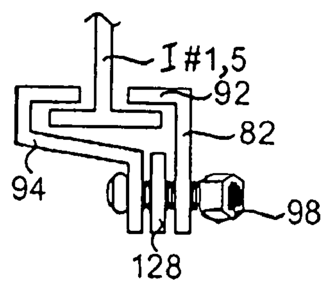
FIG. 5B is a side elevation, partly in section showing the attachment of the alignment assembly to an I-beam of the trailer undercarriage.

FIG. 5B is a side elevation, partly in section, showing the clamping arrangement for the attachment of the alignment assembly plates 82, the backing plates 96 and the hanger assembly support plates 102 to the respective I-beams #s 1–5 of the trailer undercarriage. The flange 92 rests on the bottom flange of the I-beam, and is secured by clamp member 94 and bolts 98. FIG. 5C is a side section view through the inboard clamp assembly showing the engagement of the tang 108 of the hanger assembly support plate 102 by the clamp bolts 98.

FIG. 6A is an isometric exploded view of the pallet box hanger assembly, including the side support plate 102*a* and the paired J-hooks 104*a*, the connecting rod 112 and the locking lever and hasp 114. A related enlarged section of FIG. 6A is shown in FIG. 6B, an isometric view of the assembly detail of the J-hooks 104*a* of FIG. 6A showing the biasing spring 118. The side support plate 102*a* is supported by flange 92 that is clamped at the outboard end of the I-beam #1 by clamp assembly 94 and bolts 98, as in FIG. 4. At the inboard end, the tang 128 is clamped and bolted between the plate 82*a* and its clamp 94*a* at the inboard end of the alignment panel vertical section 84*a*, as best seen in FIG. 5C. The outboard edge of the support plate 102*a* included outwardly bent flange portion 106*a* to assist in guiding the box in place during loading. The rod 112 connecting the two J-hooks 104*a* is journaled in sleeve 116*a*, 116*b*, 116*c* which is welded or otherwised attached adjacent the lower margin of the support plate 102*a* so that the J-hooks are centered in the notches 122. The outboard end of the connecting rod 112 includes a locking lever 114 having a rectangular hole 126 in a hasp portion for receiving the keeper loop for a lock (not shown). The biasing spring 118 is shown in more detail in FIG. 6B; one end is welded to or engaged in a hole in the connecting rod, and the free end bears against the support plate 102*a*. It is wound appropriately so that the J-hook is biased closed, that is, rotated counter-clockwise into the locking lever 114 "down" or locked position, as shown by Arrow B (on the rod adjacent the spring 118). The lock loop or eye 124 projects through the hole 126 to receive a keeper locks hackle or pin. When the pallet box is raised up during the hanging step of the loading process, the hanger pin 72 engages the cam surface 120 of the J-hook, rotating it to the open position (clockwise in FIG. 6B) against the spring force. As the pin passes upwardly past the upper lip 130 of the J-hook, the spring forces the J-hook counterclockwise into the "closed" so that when the box is lowered slightly, the pin is fully engaged in the retaining, load bearing cradle portion 132 of the hook.

FIG. 7 is an isometric of the pallet box embodiment of FIGS. 1 and 2 from the opposite corner showing the side door protective grate 44, the side door 40 folded down via hinge 42, a gas port 66 for controlling the atmosphere in the box (on the facing side) and a seal for hermetically sealing the lid 30 to the box walls 24, 26, 28. The door includes latches 48*a*, 48*b*.

Figures 8A, 8B:
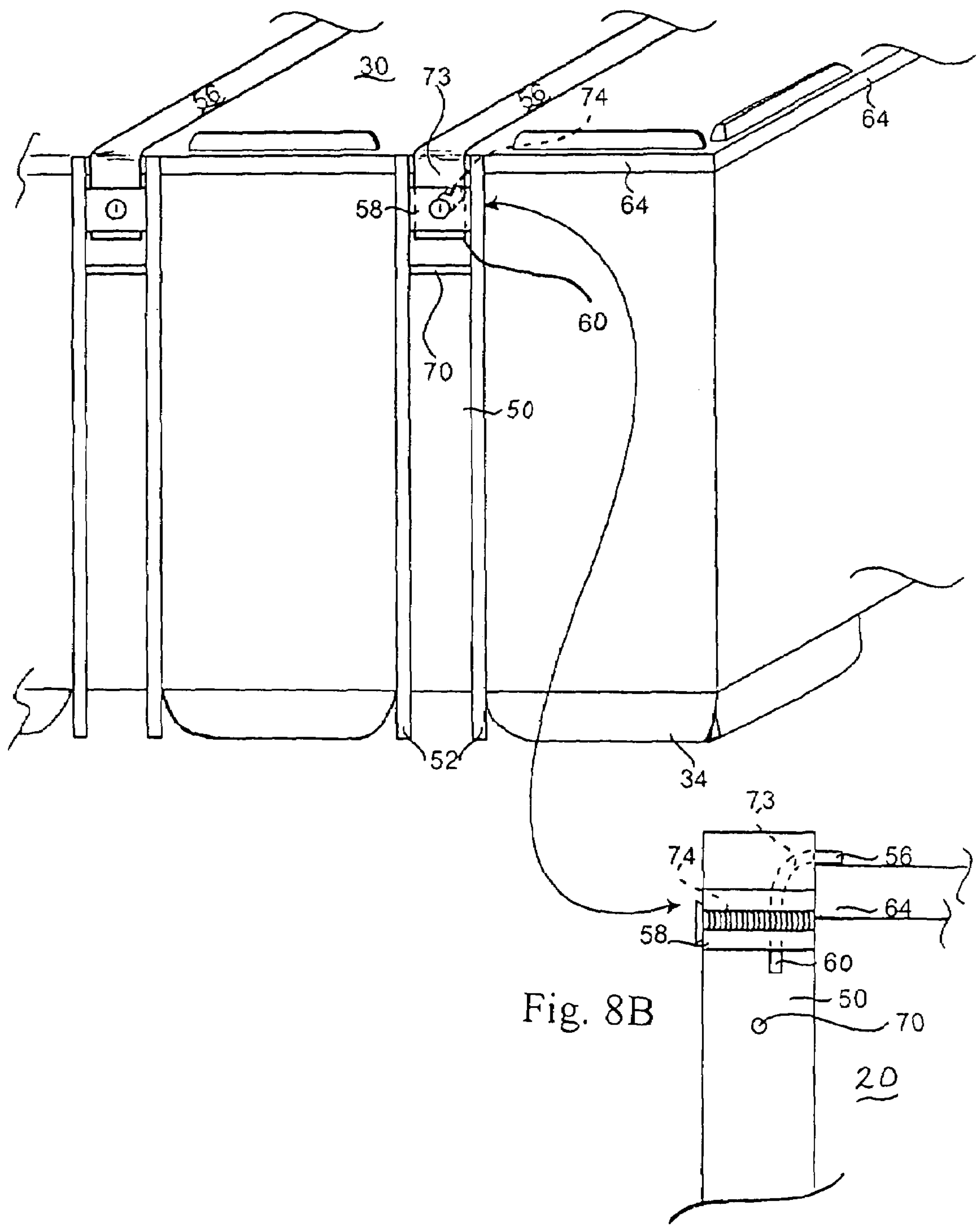
FIG. 8A is an isometric detail of one of the side support channels showing its full length vertical extension to the floor, provision for fork lift fork access and top strap lock.
FIG. 8B is a vertical section elevation of the lock assembly of FIG. 8A.

FIG. 8A is an isometric detail of one of the side support channels 50 showing its full length vertical extension to the floor 52, provision for forklift fork/tine access 38 and top strap lock 58. The top strap 56 wraps over the lip 64 of the top 30, and the depending portion 73 includes a hole 75 that engages at least one shackle, preferably a notched, hardened steel shackle 74 of the tumbler-activated mechanism of the lock 58. FIG. 8B is a vertical section elevation of the lock assembly of FIG. 8A showing another view of the channel lock 50 and the engagement of the shackle 74 and hole 75. While one channel lock is shown, it should be understood that there may be one lock per channel to resist the possibility of a corner of the lid being pried up.

INDUSTRIAL APPLICABILITY

It is clear that the inventive pallet box, either alone or together with the alignment and hanger assemblies provides a commercially significant system for better utilization of the carrying capacity of long haul trucks while at the same time provides for improved security of the goods being shipped, thereby reducing damage and theft losses during transport and warehousing. Either advantage alone is both substantial and important to the shipping industry, and of great significance to the manufacturers and shippers of goods in commerce. The pallet box in being unitary, that is, in not having loose parts that can become lost or non-functional, provides additional advantages for commerce. Further it permits the possibility of direct selling out of the box, without the need for intermediate packing in cardboard cartons.

As such, the inventive cargo shipping and warehousing system is applicable to all industries involved in transport and warehousing of goods, especially high-added-value goods, such as pharmaceuticals, consumer electronics goods (computers, home electronics, etc.), electronic parts (computer components, chips, memory boards), entertainment products (such as CDs, DVDs and Video Tapes), and goods requiring high security transport (such as pharmaceuticals, mail, proprietary information) and the like.

It should be understood that various modifications within the scope of this invention can be made by one of ordinary skill in the art without departing from the spirit thereof and without undue experimentation. For example, the bin can be pressurized to atmospheric or above with the special, selected gas for enhancing the preservation or ripening of agricultural goods carried in said bins during transport. In the alternative, the bins can be partly evacuated, being strong enough to sustain a negative pressure during transport and handling. This invention is therefore to be defined by the scope of the appended claims as broadly as the prior art will permit, and in view of the specification if need be, including a full range of current and future equivalents thereof.

The invention claimed is:

1. Alignment and hanger assembly for underslung transport of containers by truck trailers comprising in operative combination:

i) a pair of spaced vertically orientable guide panels having horizontal flanges for engaging selected bottom flanges of I-beams of a wailer undercarriage;

j) at least one cross-brace joining said guide panels in preselected spaced relationship, said cross brace providing a stop for said container during positioning under said truck undercarriage;

k) at least one clamp member for each of said guide panels to secure said guide panel to a selected trailer undercarriage I-beam inboard of a side of said trailer body;

l) a pair of spaced, vertically orientable support panels securable to said selected bottom flanges of I-beams of a trailer undercarriage outboard of said guide panels clamps and extending outwardly short of said trailer body side;

m) at least one clamp member for each of said support panels to secure said support panel to a selected trailer undercarriage I-beam adjacent said trailer body side; and n) at least one hanger member associated with said support panel for releasably engaging and retaining the loaded weight of a container slung under said trailer undercarriage during transport.

2. Underslung container transport assembly as in claim 1 wherein each of said support panels includes a hanger member comprising at least one J-hook for engaging load-carrying pins on a container.

3. Underslung container transport assembly as in claim 2 wherein said J-hook includes an actuating rod having an accessable locking lever at an outboard end thereof, and said actuating rod is journaled to said support panel and includes a biasing spring to bias said J-hook in a locked position.

4. Underslung container transport assembly as in claim 3 wherein each said guide panel includes a lower portion extending downwardly below the lower margin of said support panel, said lower portion includes a flared flange on the outboard end thereof to assist in orienting and guiding a container into proper position therebetween for engagement with said hanger members.

5. Underslung container transport assembly as in claim 4 which includes at least one vertical backing plate secured to said cross brace and a clamp member for securing said backing plate to an I-beam of said trailer undercarriage intermediate of said guide panel I-beams.

6. Method of increasing the carrying capacity of truck trailers comprising the steps of:

a) mounting a load carrying, substantially quick-release, container engagement, support and retention assembly to the undercarriage I-beams of a truck trailer to provide a container docking space extending from an outboard side of said trailer to about a centerline of said trailer;

b) providing a plurality of universal, self-contained containers having load-carrying structural elements in at least two opposed sidewalls thereof for auto-latchingly, matingly engaging said quick-release container support assembly, the depth of said container being selected to be less than half the width of the trailer to permit retaining said containers in said docking space to one or the other side of said trailer undercarriage centerline;

c) loading said containers under the undercarriage of said trailers by engaging the load-carrying elements thereof to said container support assembly; and d) transporting said containers in an underslung mode.

7. Method as in claim 6 wherein said containers are stackable, and sized both for said underslung transport mode and for transport stacked in the interior of said trailer body.

8. Method as in claim 7 wherein said containers are integrated, sealable and lockable for reduced tampering and theft during warehousing and transport activities.

9. Method as in claim 8 which includes the step of charging said containers with a gas selected from a product enhancing gas, a security gas and a disinfecting gas.

10. Method as in claim 8 wherein said containers include at least one of identification elements and in transit location tracking devices.

* * * * *